Aug. 21, 1956  R. E. RISLEY ET AL  2,759,493
PIPE REPAIR SLEEVE
Filed Aug. 14, 1951  4 Sheets-Sheet 4

INVENTORS.
ROGER E. RISLEY
GEORGE D. KISH
BY Robert E. Burns
ATTORNEY

United States Patent Office 2,759,493
Patented Aug. 21, 1956

2,759,493
PIPE REPAIR SLEEVE

Roger E. Risley and George D. Kish, Bradford, Pa., assignors to Dresser Industries, Inc., Dallas, Tex., a corporation of Pennsylvania Application August 14, 1951, Serial No. 242,729

10 Claims. (Cl. 138—99)

This invention relates to repair sleeves for pipe lines and is more particularly concerned with a split repair sleeve provided with means for preventing uneven stresses to be exerted upon the sleeve.

Steel and iron pipe lines used for the transmission of oil, gas, water and like fluids, both above and below ground, occasionally develop leaks at the joint between adjacent sections of pipe, or breaks or cracks occur in the body of the pipe sections themselves. Whenever possible, these leaks, breaks and cracks are repaired without taking the pipe line apart to replace the damaged portion, since costly interruptions in service are thus avoided. For this purpose, there has been developed the so-called split repair sleeve which is adapted to be clamped around the portion of the pipe line to be repaired to provide a flexible, fluid-tight enclosure around the damaged or faulty section of the line. Split repair sleeves used commercially for this purpose are generally made from cast or wrought metal and commonly comprise two semi-cylindrical segments provided with longitudinal flanges which are adapted to receive bolts for drawing together the sleeve segments upon suitable packing material to seal the longitudinal joint. The ends of the segments are brought into fluid-tight engagement with the outer surface of the pipe upon which the sleeve is installed by means of suitable gaskets which are compressed radially against the pipe by means of clamping rings or followers. When split repair sleeves of this character are installed, both the ends and the longitudinal edges of the sleeve sections are subjected to bending stresses when the bolts are tightened to compress the end gaskets and to effect a fluid-tight seal along the longitudinal joint between the sleeve sections. These bending stresses are of particular importance and create particularly serious problems when the sleeve is to be installed upon a pipe which carries fluid under high pressure, such as high pressure gas. Considerable tightening of the bolts is necessary to compress the gaskets and the longitudinal seals sufficiently to resist the pressure of the gas or other high pressure fluid in the line, and this tightening of the bolts frequently causes distortion of the sleeves. This distortion sometimes prevents a fluid-tight installation from being obtained. Thus, when the opposed side flanges are drawn together by the bolts they tend to pivot about the longitudinal seal as a fulcrum and thus cause the sides of the sleeves to be pulled away from the pipe. This has an adverse effect upon the fluid-tightness of the end gaskets, and when this type of distortion is excessive, satisfactory fluid-tightness of the end gaskets can ordinarily not be obtained. The pressures exerted by the bolts at the ends of the sleeves and along the longitudinal edges of the sleeve are not balanced in ordinarily-used split repair sleeves, and satisfactory installation of conventional split repair sleeves on high pressure lines is thus frequently very difficult to obtain and requires highly skilled labor.

It is the principal object of the present invention to provide a split repair sleeve of improved construction adapted for installation on pipe lines without distortion.

It is another object of the invention to provide a split repair sleeve of the character indicated having means for effectively balancing the stresses exerted upon the longitudinal edges of the sleeve.

It is a further object of the invention to provide a split repair sleeve particularly suitable for pipe lines carrying high pressure fluids.

It is another object of the invention to provide a split repair sleeve of the character indicated provided with means for balancing the bending forces exerted upon the sleeve sections during installation.

In accordance with the invention we provide a split repair sleeve comprising two complementary arcuate members having end sealing means and having cooperating radially extending longitudinal flanges constructed to be drawn together by bolts when the repair sleeve is installed upon a pipe line and being adapted to receive and be engaged by resilient compensating elements extending longitudinally along both radial sides of the bolts. It is a feature of the invention that the resilient compensating elements not only balance the uneven stresses imposed by the bolts along the flanges but also eliminate the effect of the forces exerted by the followers in compressing the gaskets at the ends of the sleeve.

Other objects and features of my invention will be apparent from the following detailed description and from the drawings, wherein Fig. 1 is an end elevation of a pipe repair sleeve embodying features of the present invention;

Figure 1:
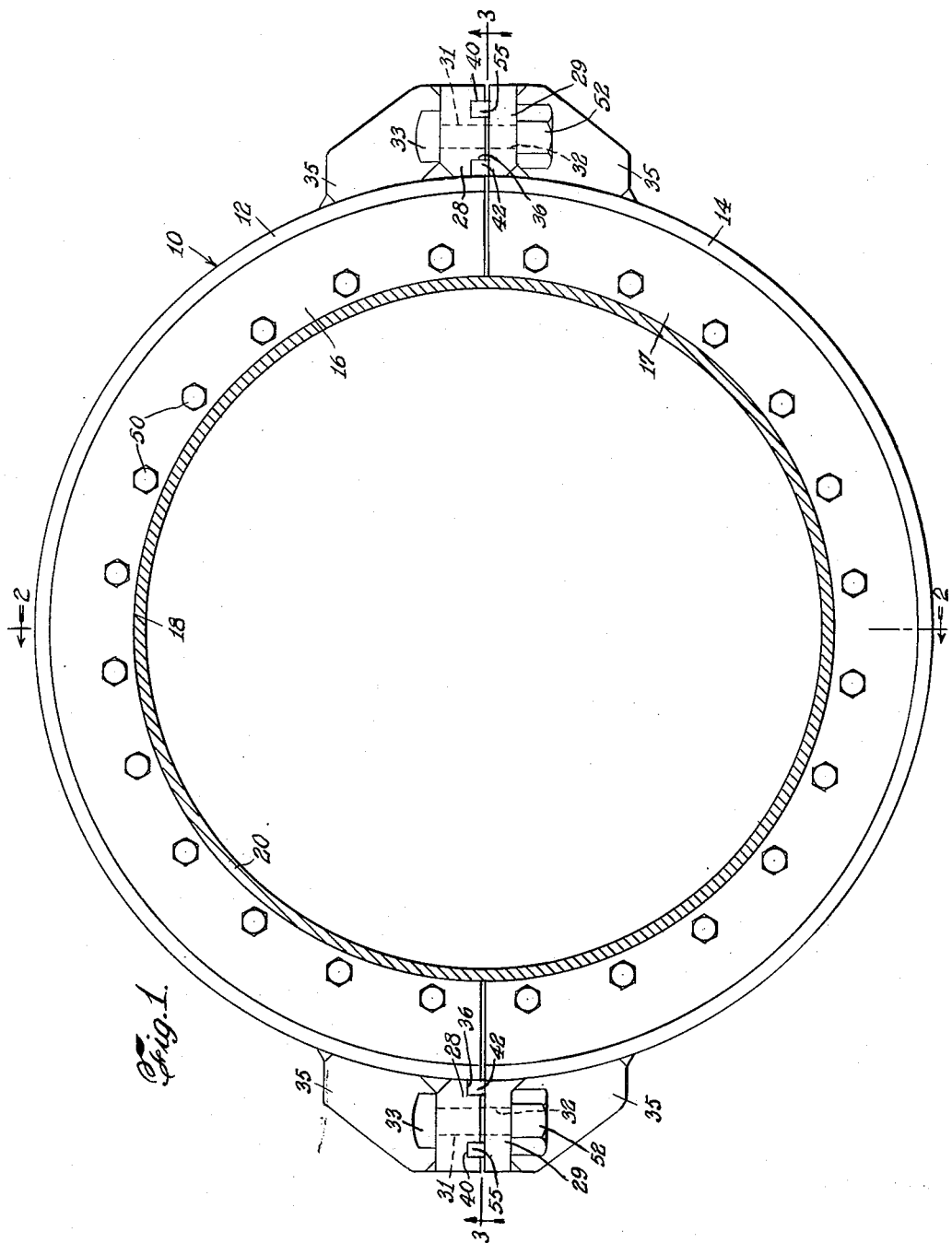
Figure 2:
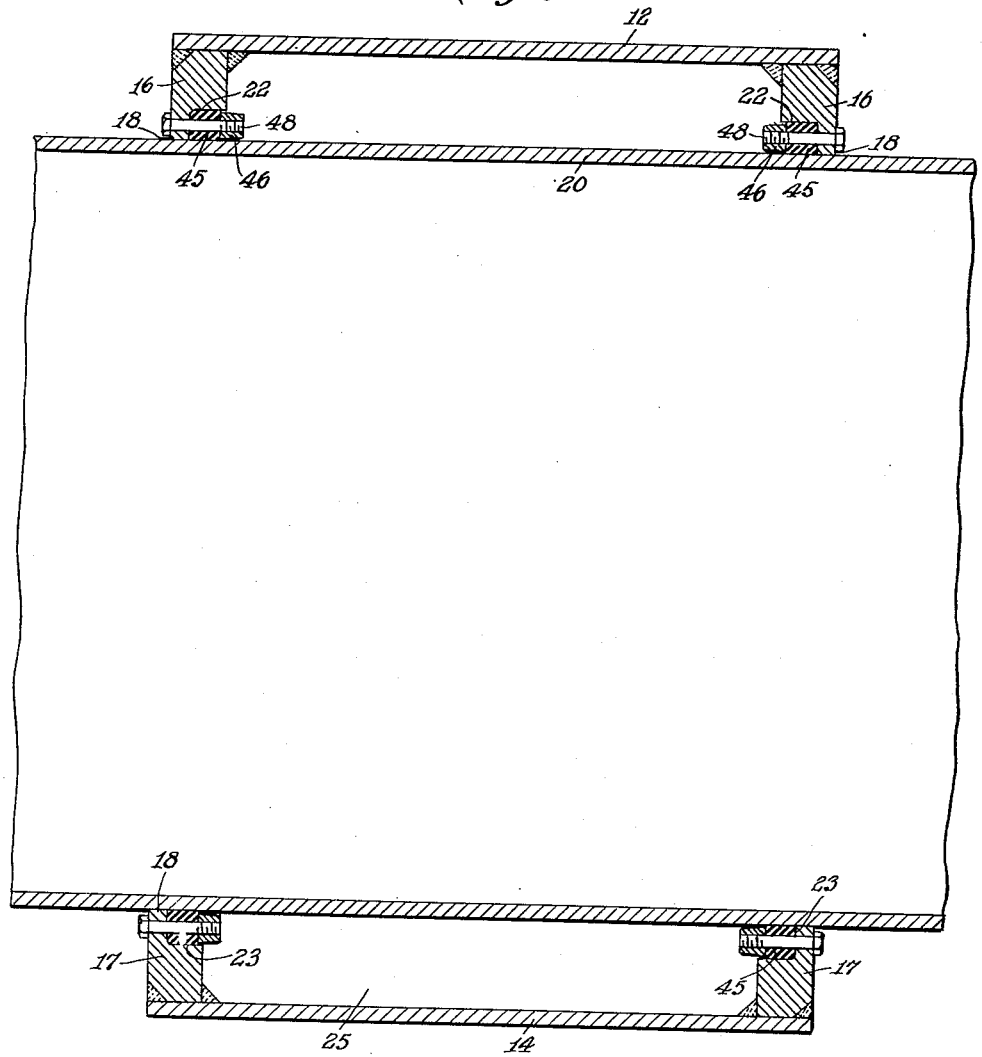
Fig. 2 is a sectional view taken approximately along the line 2—2 of Fig. 1.
Figure 3:
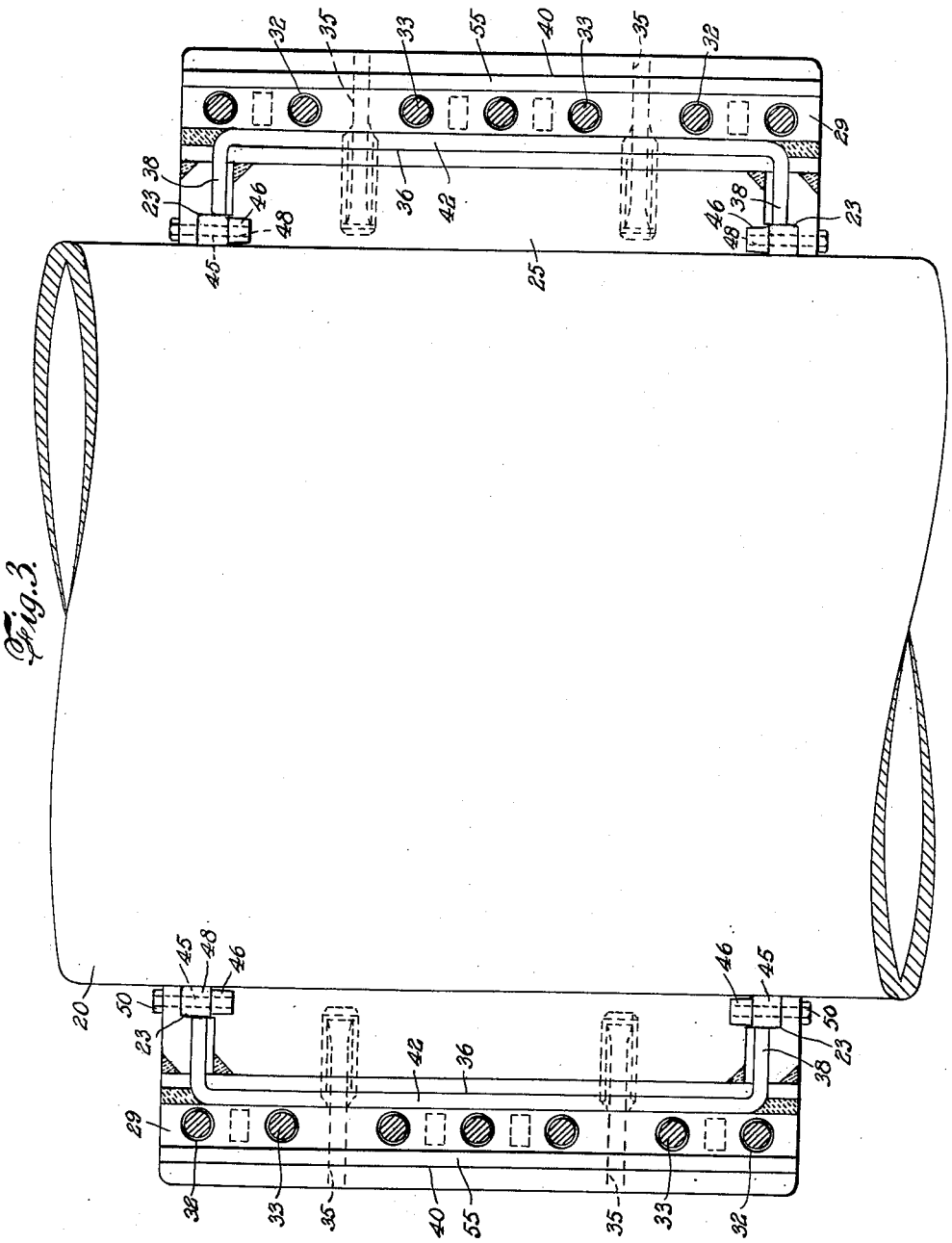
Fig. 3 is a sectional view taken approximately along the line 3—3 of Fig. 1.

Referring to the drawings, and more particularly to Figs. 1, 2 and 3, the numeral 10 designates generally the split repair sleeve which is formed from two semi-cylindrical sleeve segments 12 and 14. The ends of the sleeve segments 12 and 14 are formed with inwardly extending radial walls 16 and 17, respectively. The inner edges of the walls 16 and 17 cooperate to form circular pipe apertures 18 through which passes the pipe section 20 upon which the sleeve 10 is mounted. The inner edges of the end walls 16 and 17 are formed with gasket recesses 22 and 23, respectively, which are adapted to receive suitable packing members or gaskets for effecting fluid-tight engagement with the outer surface of the pipe, as will be described hereinbelow.

The sleeve segments 12 and 14 thus define an interior chamber 25 of sufficient diameter to enclose the pipe 20, and the chamber 25 is advantageously of sufficient size to enclose the pipe coupling (not shown) by which two adjacent sections of pipe are connected, in the event the portion of the pipe line to be enclosed by the repair sleeve is at or adjacent the coupling. The particular dimensions of the chamber 25, however, do not affect the construction of sleeve 10 insofar as it relates to the present invention, which is primarily concerned with the structure of the cooperating longitudinal portions of the sleeve segments 12 and 14.

The longitudinal edges of sleeve segments 12 and 14 are formed with complementary joining means adapted to form a fluid-tight longitudinal joint and comprising side bars 28 and 29, respectively. Side bars 28 and 29 are secured, as by welding or in any other convenient manner, to the edges of the respective sleeve segments and are formed with registering bolt holes 31 and 32, respectively, adapted to receive bolts 33 for drawing the segments together about the pipe 20. Reinforcing ribs 35 extending circumferentially over the outer surface of the segments 12 and 14, and secured thereto as by welding, reinforce side bars 28 and 29 and give them the necessary strength.

It is a feature of the invention that the side bars are formed to receive interposed resilient strips on each radial side of the bolts 33. Thus, in the embodiment illustrated in Figs. 1, 2 and 3, the side bars 28 are each formed with a longitudinally-extending groove 36 disposed adjacent the juncture line of the side bars 28 with the body of the sleeve segment 14, the ends 38 of the grooves 36 being turned radially inwardly so that they will terminate at and communicate with the respective gasket recesses 22 and 23. The grooves 36 may be of any convenient form longitudinally and they will naturally follow to a certain extent the configuration of the chamber 25. The grooves 36 are preferably of substantially uniform width throughout their length and throughout their depth and are preferably of rectangular shape, although this is not essential.

Disposed on the outer radial side of the bolt holes 32 is a longitudinally-extending groove 40 formed in each of the side bars 28. As shown in Fig. 3, the grooves 40 preferably extend from one end of the side bars 28 to the other. Like the grooves 36, the grooves 40 are preferably of substantially uniform width and depth throughout their length.

The grooves 36 are adapted to receive a longitudinal side packing 42 of a width substantially equal to that of the grooves 36 and of a thickness somewhat greater than the depth of these grooves so that when the side packing 42 is inserted in the grooves, a considerable portion of it will extend upwardly above the face of side bars 28. Thus, when the two sleeve segments 12 and 14 are drawn together by the action of bolts 33, the packing 42 is compressed and is displaced laterally to supply a secure fluid-tight seal.

A fluid-tight seal is likewise provided at the ends of the sleeve 10 by means of previously-mentioned packing members or gaskets 45 which are adapted to be compressed in gasket recesses 22 and 23 and to be displaced radially inwardly into sealing relationship with the outer surface of pipe 20 and side packings 42. While gaskets 45 may be of any convenient form they are suitably cut from a straight strip or molded to a circular form with the meeting ends formed to effect a butt joint, or preferably the ends are mitered or bevelled so that they be wrapped around the pipe and inserted in gasket recesses 22 and 23 with the bevelled ends over-lapped.

The gaskets 45 and the side packing strips 42 are formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined.

Gaskets 45 are compressed into sealing relationship with pipe 20 by means of clamping rings or followers 46. The followers 46 may be formed in two sections with abutting ends or may be formed from two sections with complementary over-lapping ends defined by portions of reduced thickness, i. e. approximately half the thickness of the main body of the followers, so that when the end portions are over-lapped the over-all thickness of the follower will not be increased. Each follower is provided with a series of threaded apertures 48 which are adapted to register with bolt holes in end walls 16 and 17 communicating with the gasket recesses 22 and 23. To compress the gaskets 45, followers 46 are drawn toward end walls 16 and 17 by means of bolts 50.

The gaskets 45 and the side packing strips 42 thus cooperate to provide a continuous seal around the pipe 20 and between the segments 12 and 14 of the seal 10. As will be apparent by reference to Fig. 1, when the bolts 33 are tightened by means of nuts 52, there will be a tendency for a bending stress to be imposed upon the walls of the sleeve segments, which will tend to distort the segments. In some cases not only do these bending stresses, if unchecked, damage the repair sleeve but they frequently make it difficult to effect a satisfactory seal between the longitudinal edges of the sleeve or depress the central portion of the sleeve segments to such an extent that the seal formed by the end gaskets is broken. The repair sleeve of the invention checks and eliminates these bending stresses and makes possible a uniform effective application of fluid-tight sealing pressure in all parts of the sleeve. As previously mentioned, the side bars 28 are provided with grooves 40 on the outer radial side of the bolts 33. In these grooves are seated resilient compensating strips 55, which serve to distribute the forces exerted by the bolts 33 when the sleeve segments are drawn together. The compensating strips 55 may be formed from the same material as that from which the side packing strip 42 is formed or may be formed from a material of greater or lesser resiliency.

The forces acting upon the sleeve as a whole may be designated by the formula $S+E=C$, wherein S is the force exerted on the side pack 42, E is the force exerted on the end gasket 45 and C is the force which is set into operation by the resilient compensating strips 55. The compensating strips 55 are selected to fulfill the conditions of this equation and are thus generally less resilient than the side pack 42 and end gaskets 45. They do, however, have a certain amount of resiliency, since lack of any resiliency sets up forces which nullify the effect of the compensating gasket. Thus, if the compensating strips 55 were formed from a non-resilient material, such as steel, the benefits and advantages of the construction of the present invention would not be obtained. The resiliency or compressive resistance of the materials is conveniently expressed in terms of durometer values and in accordance with the invention, the side packings and compensating strips are formed from rubbery materials having durometer values lying between 50 and 85. To satisfy the above equation, the side packings may have the same resiliency or compressive resistance in some cases or may have different compressive resistances, depending upon the relative positions of these two rubbery elements as will be explained below.

In the embodiment shown in Figs. 1, 2 and 3, the side packing strip 42 and the compensating strip 55 are spaced at substantially equal distances on either side of the bolts 33 and are of substantially the same cross-section. In this embodiment the side pack 42 and the compensating strip 55 are formed from materials having durometer values lying between 50 and 85 but the materials are selected so that the compensating strip 55 has a compressive resistance which is 10 to 50% greater than the compressive resistance of the side packing 42. The invention, however, is not limited to the embodiment of Figs. 1, 2 and 3 and the size and relationship of the side packings and the compensating strips may be varied to a considerable extent within the scope of the invention. Some variations are shown by way of example in Figs. 4, 5 and 6, wherein corresponding parts are designated by the same reference numbers used in Figs. 1 to 3 with the addition of 100, 200 and 300, respectively.

Figure 4:
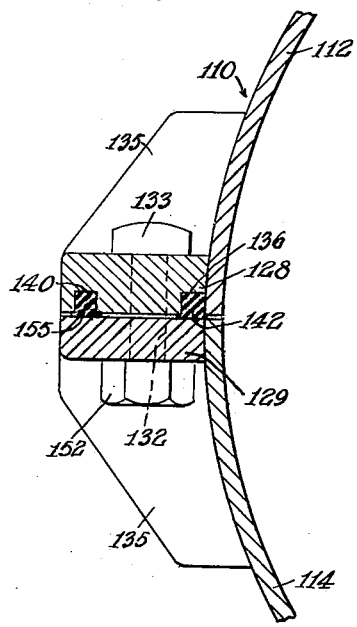
Fig. 4 is a sectional view of a modified form of side pack arrangement corresponding to another embodiment of the invention.

Referring to Fig. 4, for example, there is shown the longitudinal joint structure of a split repair sleeve 110 formed from sleeve segments 112 and 114. The sleeve segment 112 has a side bar 128 and sleeve segment 114 is provided with a complementary side bar 129. Side bar 128 is provided with a longitudinally-extending groove 136 disposed adjacent the juncture line of the side bar 129 with the body of the sleeve segment 114 in which is disposed a side packing 142. Side bar 128 also has a longitudinally extending groove 140 formed radially outwardly from the groove 136 and having substantially the same cross-section as groove 136, and has a bolt hole 132 between the two grooves. It will be seen that in the embodiment of Fig. 4 the bolt hole 132 which is adapted to receive bolt 133 is substantially closer to groove 136 than it is to groove 140. In this embodiment the outer groove 140 receives a compensating strip 155 which is advantageously formed from a material having a higher compressive resistance than the side packing strip 142. Both the side packing strip 142 and the compensating strip 155 are formed from the type of material previously described in connection with side packing 42, gaskets 45 and compensating strips 55, i. e. rubber, rubber composition or compositions having like properties and characteristics. It is well-known that various rubbers have varying degrees of resiliency or compressive resistance and in the embodiment of Fig. 4 the materials used for forming the side packing 142 and the compensating strip 155 are selected in such manner that the side packing 142 has the greater resiliency.

Figure 5:
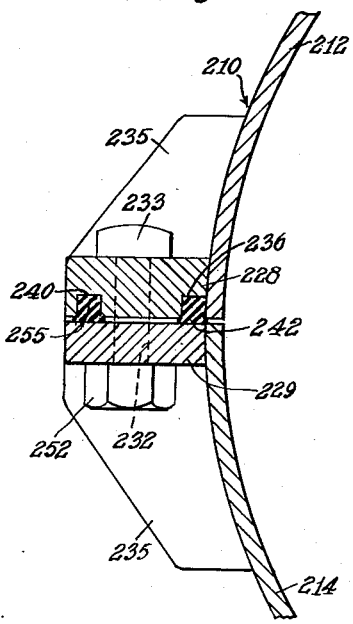
Fig. 5 is a similar view of another embodiment of the invention.

Referring to Fig. 5, there is shown an embodiment of the invention in which the bolt hole in the side bar is positioned closer to the compensating strip than to the side packing. Thus, as seen in Fig. 5, the sleeve segment 214 of split sleeve 210 is provided with a side bar 228 formed with a side packing groove 236 adjacent the wall of sleeve segment 214 and a compensating strip groove 240 disposed radially outwardly from the groove 236. The bolt hole 232 is formed in the side bar 228 in such manner that it is a substantially greater distance from the groove 236 than from the groove 240. In this embodiment the side packing strip 242 is advantageously formed from a material of greater compressive resistance than the material used in forming the compensating strip 255, although strips of substantially equal compressive resistance may also be used.

Figure 6:
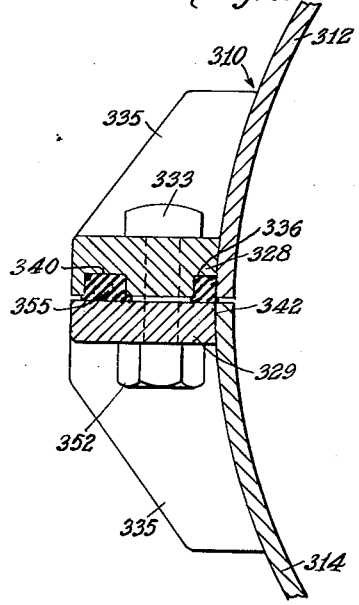
Fig. 6 is a similar view of further embodiment of the invention.

In Fig. 6 is shown an embodiment of the invention in which one of the strips lying in the grooves formed in the side bar of the split repair sleeve is of greater width than the other. Thus, as seen in Fig. 6, the side bar 328 of sleeve segment 314 is formed with a side packing groove 336 and an outwardly spaced compensating strip groove 340. The groove 340 is substantially twice the width of groove 336. Disposed in the grooves 336 and 340 are side packing 342 and compensating strip 355, respectively, the packing 342 and the strip 355 being dimensioned to fill the corresponding grooves and to extend upwardly above the face of the side bar 328. In this embodiment the compensating strip 355 is advantageously of lesser compressive resistance than the side packing strip 342.

It will be obvious that the size and relative spacing of the grooves in the side bars of our split repair sleeve relative to the bolt holes is susceptible of considerable variation within the scope of the invention. The important feature of the invention is in the use of resilient materials both for the side packing and for the compensating strip disposed radially outwardly from the bolt holes. This construction is effective to compensate for unequal stresses exerted upon the sleeve segment when the sleeve is installed and a uniform fluid-tight installation is possible without distortion of the sleeve.

It will be obvious to those skilled in the art that various other changes and modifications may be made in the embodiments described and illustrated without departing from the scope of the invention as defined in the appended claims and it is intended, therefore, that all matter contained in the foregoing description and in the drawings shall be interpreted as illustrative and not in a limiting sense.

This application is a continuation-in-part of our co-pending application Serial No. 98,298, filed June 10, 1949, now Patent No. 2,588,573.

What we claim and desire to secure by Letters Patent is:

1. A split sleeve pipe repair device adapted to enclose a portion of a pipe line, comprising two complementary arcuate segments, a packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, resilient compressible sealing means confined in said radially inner groove to merge with the packing in said packing recess, longitudinally-extending resilient rubbery non-metallic compressible means confined in said radially outer groove, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

2. A split sleeve pipe repair device adapted to enclose a portion of a pipe line, comprising two complementary arcuate segments, a packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, said apertures being closer to said outwardly-disposed grooves than to said inwardly-disposed grooves, resilient compressible sealing means confined in said radially inner groove to merge with the packing in said packing recess, longitudinally-extending resilient rubbery non-metallic compressible means confined in said radially outer groove, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

3. A slit sleeve pipe repair device adapted to enclose a portion of a pipe line, comprising two complementary arcuate segments, packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, said apertures being closer to said inwardly-disposed grooves than to said outwardly-disposed grooves, resilient compressible sealing means confined in said radially inner groove to merge with the packing in said packing recess, longitudinally-extending resilient rubbery non-metallic compressible means confined in said radially outer groove, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

4. A split sleeve pipe repair device adapted to enclose a portion of a pipe line, comprising two complementary arcuate segments, a packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, said inwardly-disposed grooves and said outwardly-disposed grooves being equally spaced from said apertures, resilient compressible sealing means confined in said radially inner groove to merge with the packing in said packing recess, longitudinally-extending resilient rubbery non-metallic compressible means confined in said radially outer groove, a major portion of said sealing means and said compressible means being disposed in said grooves below the surface of the respective flange portions but said sealing means and said compressible means saving a minor portion projecting from the surface of the flange portions for engagement with the flange portions of the complementary sleeve segment.

5. A split sleeve pipe repair device adapted to enclose a portion of a pipe line, comprising two complementary arcuate segments, a packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, resilient compressible sealing means confined in said radially inner groove to merge with the packing in said packing recess, longitudinally-extending resilient rubbery non-metallic compressible means confined in said radially outer groove, said resilient non-metallic compressible means being of substantially greater radial width than said sealing means and a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

6. In a pipe line, a pipe section having a damaged portion, a split sleeve repair device enclosing said damaged portion, said split sleeve comprising two complementary arcuate segments, a packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, resilient compressible sealing means confined in said radially inner groove to merge with the packing in said packing recess, longitudinally-extending resilient rubbery non-metallic compressible means confined in said radially outer groove, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

7. In a pipe line, a pipe section having a damaged portion, a split sleeve repair device enclosing said damaged portion, said split sleeve comprising two complementary arcuate segments, a packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, said inwardly-disposed grooves and said outwardly-disposed grooves being equally spaced from said apertures, resilient compressible sealing means confined in said radially inner groove to merge with the packing in said packing recess, longitudinally-extending resilient rubbery non-metallic compressible means confined in said radially outer groove, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

8. A split sleeve pipe repair device adapted to enclose a portion of a pipe line, comprising two complementary arcuate segments, a packing recess at the end of each segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, resilient rubbery non-metallic compressible sealing means confined in said radially inner groove to merge with the packing in said packing recess, longitudinally-extending resilient rubbery non-metallic compressible means confined in said radially outer groove, said sealing means in said radially inner groove and said compressible means in said radial outer groove having durometer values lying between 50 and 85, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

9. A split sleeve pipe repair device adapted to enclose a portion of a pipe line, comprising two complementary arcuate segments, a packing recess at the end of said segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on the radially outer side of said apertures and extending axially beyond said apertures, resilient rubbery non-metallic compressible sealing means confined in said radially inner groove to merge with the packing in said packing recess, longitudinally-extending resilient rubbery non-metallic compressible means confined in said radially outer groove, said sealing means in said radially inner groove and said compressible means in said radial outer groove having durometer values lying between 50 and 85 with the compressive resistance of the compressible means in said radially outer groove being 10 to 50% greater than the compressive resistance of the sealing means in said radially inner groove, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

10. A split sleeve pipe repair device adapted to enclose a portion of a pipe line, comprising two complementary arcuate segments, a packing recess at the end of said segment for receiving an end packing therein and means to compress said end packing in the packing recess to seal the ends of said segments around the pipe line portion, said end packing extending over said ends of said sleeve segments to effect complete sealing thereof, flange portions extending radially outwardly from the longitudinal edges of each of said segments, said flange portions being provided with axially-spaced apertures for receiving means for drawing said sleeve segments together and the flange portions of one of said segments being provided with two radially spaced-apart axially-extending grooves, one of said grooves lying radially inwardly of said apertures adjacent the body of the arcuate segment and communicating at its ends with the packing recess at each end of said segment, and the other of said grooves lying on a radially outer side of said apertures and extending axially beyond said apertures, resilient rubbery non-metallic compressible sealing means confined in said radially inner groove to merge with the packing in said packing recess, longitudinally-extending resilient rubbery non-metallic compressible means confined in said radially outer groove, said sealing means in said radially inner groove and said compressible means in said radial outer groove having durometer values lying between 50 and 85 with the compressive resistance of the compressible means in said radially outer groove being 10 to 50% greater than the compressive resistance of the sealing means in said radially inner groove, said inwardly-disposed grooves and said outwardly-disposed grooves being equally spaced from said apertures, a major portion of said sealing means and said compressible means being disposed in said grooves below the surface of the respective flange portions but said sealing means and said compressible means having a minor portion projecting from the surface of the flange portions for engagement with the flange portions of the complementary sleeve segment.

References Cited in the file of this patent

UNITED STATES PATENTS

| Number | Name | Date |
|---|---|---|
| 320,771 | Ford | June 23, 1885 |
| 1,051,086 | Clark | Jan. 21, 1913 |
| 1,568,268 | Clark et al. | Jan. 5, 1926 |
| 1,816,421 | Clark et al. | July 28, 1931 |
| 2,188,302 | Pfefferle | Jan. 30, 1940 |
| 2,286,751 | Merrill | June 16, 1942 |